United States Patent
Slanina

(10) Patent No.: US 6,230,023 B1
(45) Date of Patent: May 8, 2001

(54) METHOD AND DEVICE FOR A TRANSMIT POWER CONTROL FOR CONNECTIONS BETWEEN A BASE STATION AND MOBILE STATIONS OF A RADIO COMMUNICATIONS SYSTEM

(75) Inventor: Peter Slanina, Judenau (AT)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/444,943

(22) Filed: Nov. 22, 1999

Related U.S. Application Data

(63) Continuation of application No. PCT/DE98/01332, filed on May 12, 1998.

(30) Foreign Application Priority Data

May 22, 1997 (DE) ............................................. 197 21 503

(51) Int. Cl.[7] ..................................................... H04B 7/00
(52) U.S. Cl. ........................ 455/522; 455/422; 455/432; 455/526; 455/67.1; 455/69
(58) Field of Search ................... 455/522, 67.1, 455/437, 435, 438, 440, 432, 69, 526

(56) References Cited

U.S. PATENT DOCUMENTS

| | | | | |
|---|---|---|---|---|
| 5,485,486 | * | 1/1996 | Gilhousen et al. | 455/522 |
| 5,548,616 | * | 8/1996 | Mucke et al. | 375/295 |
| 5,550,809 | * | 8/1996 | Bottomley et al. | 370/18 |
| 5,566,209 | * | 10/1996 | Forsen et al. | 375/262 |
| 5,752,172 | * | 5/1998 | Matero | 455/522 |
| 5,884,187 | * | 3/1999 | Ziv et al. | 455/522 |
| 6,041,081 | * | 3/2000 | O et al. | 455/116 |
| 6,049,535 | * | 4/2000 | Ozukturk et al. | 455/522 |

FOREIGN PATENT DOCUMENTS

| | | |
|---|---|---|
| 0 462 952 A1 | 12/1991 | (EP) . |
| 0 565 505 A2 | 10/1993 | (EP) . |
| 0 680 160 A2 | 11/1995 | (EP) . |
| 0 682 412 A2 | 11/1995 | (EP) . |

* cited by examiner

Primary Examiner—Daniel Hunter
Assistant Examiner—Yemane Woldetatios
(74) Attorney, Agent, or Firm—Herbert L. Lerer; Laurence A. Greenberg; Werner H. Stemer

(57) ABSTRACT

A method for controlling transmit power for connections between a base station and mobile stations of a radio communications system includes the steps of designating a direction of transmissions from mobile stations to a base station as an upward direction, and designating a direction of transmissions from the base station to the mobile stations as a downward direction. Information is transmitted to the mobile stations in the downward direction simultaneously in one frequency channel. Received powers are determined at at least two of the mobile stations. A dynamic range of transmit powers for the frequency channel is set. Transmit powers for the base station are determined. The determined transmit powers are mobile-station-specific by taking the received powers into account. A minimum transmit power is at least equal to a maximum transmit power minus the dynamic range. A device for controlling the transmit power is also provided.

15 Claims, 3 Drawing Sheets

Fig. 3

```
for all frequency channels and time channels
    determine connection with rdlpmin
    for all connections of the frequency/time channel
        yes    theor. sdlp < (Pmax-mg)
        sdlp = pmax-mg
```

Fig. 4

Table 1

| Connection BS to | Attenuation [dB] | theor.sdlp [dB] | sdlp [dB] |
|---|---|---|---|
| MS1 | rdlpmin = 80 | Pmax = 0 | 0 |
| MS2 | 60 | -20 | -20 |
| MS3 | 40 | -40 | -20 | for mg = 20 dB

METHOD AND DEVICE FOR A TRANSMIT POWER CONTROL FOR CONNECTIONS BETWEEN A BASE STATION AND MOBILE STATIONS OF A RADIO COMMUNICATIONS SYSTEM

CROSS-REFERENCE TO RELATED APPLICATION

This application is a continuation of copending International Application No. PCT/DE98/01332, filed May 12, 1998, which designated the United States.

BACKGROUND OF THE INVENTION

Field of the Invention

The invention relates to a method and a device for a transmit power control for connections between a base station and mobile stations of a radio communications system, for example a digital mobile radio network.

Radio communications systems serve to transmit subscriber signals via an air interface or radio interface using radio-frequency oscillations. Such radio communications systems are, for example, mobile radio networks or devices for wirelessly linking subscribers to a landline network or fixed network. The subscriber signals of various subscribers, that is to say mobile stations, are transmitted via a common radio interface. The term multiuser telecommunication system is used in this case. Time division multiplex, frequency division multiplex or code division multiplex methods can be used to separate the subscribers, that is to say the different connections between mobile stations and a base station. It is also possible to combine these methods.

In the following, a radio communications system is described in which information is transmitted to a plurality of mobile stations simultaneously in one frequency channel. These connections therefore cannot be separated by time division multiplex methods, nor by frequency division multiplex methods. The transmission from the mobile stations to the base station is designated as the upward direction, and the transmission from the base station to the mobile stations is designated as the downward direction.

The receivers of the base station or the mobile stations need to evaluate the information from a plurality of connections which is transmitted simultaneously in one frequency channel. The problem arises in this case that the received powers of the various connections vary greatly in the case of a constant transmit power due to the different distances between receiving and transmitting radio stations. In particular, the receivers, in which the received power of their connection is low compared to the rest of the received powers, have difficulties detecting data.

It is known to introduce a transmit power control into radio communications systems in order to overcome this problem. Thus, for example, it is known from the GSM mobile radio network (Global System for Mobile Communication) to set the transmit power both in the upward direction and in the downward direction in such a way that an adequate received power is available for the respective connection in the receiver. However, in the case of the GSM mobile radio network only information of a single connection is transmitted in one frequency channel and at one instant. The problem of jointly correcting or controlling the transmit powers for a plurality of connections therefore does not arise.

Published European patent application EP 0 565 505 A2 discloses a transmit power control in a CDMA (Code Division Multiple Access) system, the signal strength received by the base station being used to increase or reduce the transmit power of signals from the mobile station to the base station, and the transmit power of the signals from the base station to the respective mobile station.

Transmit power control is also carried out in the case of CDMA (Code Division Multiple Access) mobile radio systems, for example in accordance with the Mobile Radio Standard IS-95. In this case, the transmit powers for mobile stations for transmitting in the upward direction are set in such a way that constant received powers are present for the information of all connections in the case of the receiver of the base station. For this purpose, the signal/noise ratio is determined for each connection in the base station. The measurement results are signaled to the mobile stations, whereupon the latter set their transmit powers.

The receivers of the mobile stations need to evaluate the information only for their own connection. For this reason, the requirements placed on the quality of resolution or discrimination during a reception are less stringent. However, if the number of mobile stations in the radio cell of a base station increases, the number of connections between mobile stations and the base station also increases, with the result that the sum of the influences of the remaining connections increases compared to the received power of the own dedicated connection at the receiver of a mobile station. The mobile station becomes increasingly sensitive to received power fluctuations of its own connection.

SUMMARY OF THE INVENTION

It is accordingly an object of the invention to provide a method and a device for controlling a transmit power for connections from a base station to mobile stations which overcome the above-mentioned disadvantages of the heretofore-known methods and devices of this general type.

With the foregoing and other objects in view there is provided, in accordance with the invention, a method for controlling transmit power for connections between a base station and mobile stations of a radio communications system. The method includes the steps of designating a direction of transmissions from mobile stations to a base station as an upward direction, and designating a direction of transmissions from the base station to the mobile stations as a downward direction; transmitting information to the mobile stations in the downward direction simultaneously in a frequency channel; determining received powers at at least two of the mobile stations in the downward direction; setting a dynamic range of transmit powers for the frequency channel; and determining transmit powers for the base station, the transmit powers being mobile-station-specific by taking into account the received powers, a minimum transmit power being at least equal to a maximum transmit power reduced by the dynamic range.

With the objects of the invention in view there is also provided, a device for controlling transmit power for connections between a base station and mobile stations of a radio communications system, including a storage device for storing a dynamic range and for storing received powers determined at at least two mobile stations; and an evaluation device for determining transmit powers for a base station, the evaluation device determining mobile-station-specific transmit powers by taking into account the received powers, and determining a minimum transmit power at least equal to a maximum transmit power reduced by the dynamic range.

According to the invention, a dynamic range or control range is fixed or allocated for the corresponding frequency channel for the method for a transmit power control for connections between mobile stations and a base station of a radio communications system. Furthermore, receiver powers or received powers are determined in the downward direction for at least two mobile stations. Subsequently, transmit powers or transmitter powers specific to the individual mobile stations are determined for the base station by taking into account the determined received powers. The minimum transmit power is in this case at least equal to the maximum transmit power reduced by the dynamic range or control range.

The transmit power control in the downward direction reduces the interference level in the radio cell and improves the general transmission performance in the radio communications system. With the setting of the minimum transmit power, the difference between the maximum and minimum transmit power for connections which simultaneously transmit in one frequency channel is never greater than the dynamic range. Even if the dynamic range is selected to be very large, for example amounting to the difference between the maximum and minimum provided transmit powers, and thus scarcely has any influence on the lower boundary of the transmit powers, it is possible to ensure a transmit power control in the downward direction by taking the influences of the remaining connections into account.

In accordance with a preferred embodiment of the invention, the minimum received power is identified from the received powers, which have been determined, and a corresponding maximum transmit power is calculated therefrom in the downward direction. The maximum transmit power in this case ensures an adequate transmission performance for this connection. The individual transmit powers can therefore be determined easily and, in addition to the received powers, it is also possible to take into account other quality criteria for a connection, such as the bit error rate, the signal delay or signal propagation time, the interference level in the radio cell and so forth.

According to a further embodiment of the invention, the simultaneous transmission of information to a plurality of mobile stations is performed in a time channel of the frequency channel, the time channel being formed by a time slot and the information being distinguishable with the aid of a subscriber-specific so-called "fine structure". The information is separated, for example, by using a subscriber-specific code with the aid of which the information is spread, or by using subscriber-specific training sequences which are embedded in the information.

The method according to the invention is used with particular advantage when a JD (Joint Detection)-CDMA method is used in the radio communications system at the receiving end to detect the information from different connections. In this case, not only is the information from the own, dedicated connection evaluated in the receiver, for example in the mobile stations, but with knowledge of the subscriber-specific fine structure of other connections their interfering influence on the information of the dedicated connections is reduced. Radio communications systems with this detection method are less susceptible to faults, with the result that slight deviations between the received powers of various connections are not as crucial. The data detection can still be carried out successfully even in the case of a lower signal/noise ratio. It is furthermore advantageous when the base station conveys or signals the transmit powers and/or attenuations of the remaining connections, to the mobile station for the JD-CDMA detection, and when these data are used in the detection.

According to a further embodiment of the invention, the dynamic range can be set as a function of a radio cell. It is possible in this way to meet the specific requirements of a radio cell or a transmitting method. Thus, it is possible, in a rural area having a radio cell with a large extent, to set a larger dynamic range than in urban areas, in which multipath propagation occurs more frequently and which have shorter distances between mobile stations and the base station.

Furthermore, it is advantageous to assign a mobile station a dynamic class which designates one or more dynamic ranges. The dynamic classes of the mobile stations of a frequency channel are stored and evaluated at the network end. The dynamic class can also be derived from other data typical of mobile stations, such as, for example, a product number or an approval number. An individual value can therefore be used for each mobile station in the case of the dynamic range to be selected for the determination of transmit power.

It is therefore possible, when setting the dynamic range for a radio cell, to take into account the capability of the mobile stations with respect to their data detection under the influence of the remaining connections. The more resistant a mobile station is to interference, the larger the dynamic range which can be set for the radio cell.

The mobile stations with the same or similar attenuations are advantageously assigned to a common frequency channel. It is therefore possible, for example, to combine the mobile stations with a low attenuation in one time/frequency channel, and to combine mobile stations with a large attenuation range in another time slot of the frequency channel. Consequently, the attenuations can already be taken into account when allocating radio resources to the mobile stations.

The transmit power control is advantageously carried out repeatedly, the intervals between the redeterminations being approximately between 100 ms and 1 s. These intervals depend on the variations in the transmission conditions between the mobile stations and the base station. If the rate of change is high, the transmit power control must be repeated at short intervals. The rate of change is documented, for example, by the magnitude of the changes in the reception level.

According to a preferred embodiment of the invention, the received powers are measured in the mobile stations and subsequently respectively transferred to the base station in a report message. The report message is advantageously transferred in a control channel which is assigned to a user data channel. This is a so-called associated control channel which is maintained in parallel with a user data channel between base stations and mobile stations. The measured values for the determination of the received power are advantageously averaged by the mobile station in order to reduce the influence of transient interference.

In order to reduce the outlay on calculation for the transmit power control, the transmit powers are advantageously reduced or increased in discrete steps. It is thereby possible to introduce discrete transmit power steps whose values are easy to manage at the network end.

Other features which are considered as characteristic for the invention are set forth in the appended claims.

Although the invention is illustrated and described herein as embodied in method and device for a transmit power control for connections between a base station and mobile stations of a radio communications system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 is a flow chart for determining the transmit powers; and

FIG. 4 is a table illustrating in a exemplary manner an assignment of received powers to specific transmit powers.

DESCRIPTION OF THE PREFERRED EMBODIMENTS

Figure 1:
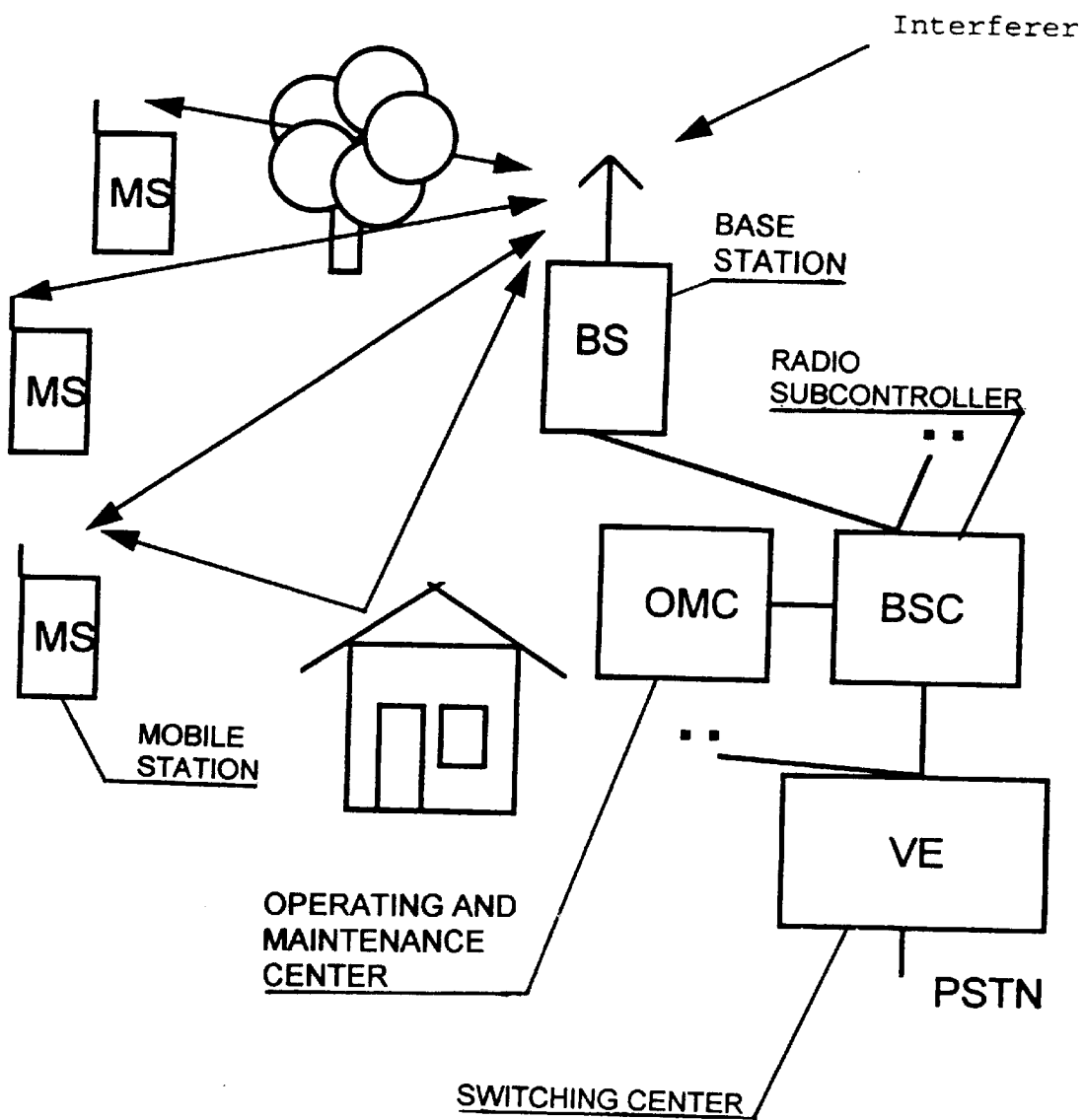
FIG. 1 is a block diagram of a mobile radio network.

Referring now to the figures of the drawings in detail and first, particularly, to FIG. 1 thereof, there is shown a radio communications system which is formed by a mobile radio network. The radio communications system includes at least one switching center VE which is networked with further switching centers and/or produces the network gateway to a landline network or fixed network PSTN. Furthermore, the illustrated switching center VE is connected to at least one radio subcontroller BSC. According to FIG. 1, a base station BS is connected to the radio subcontroller BSC. Between a base station BS and mobile stations MS there is an air interface or radio interface via which subscriber signals are transmitted by, for example, three connections.

The mobile radio network also includes an operating and maintenance center OMC which is connected to a switching center VE and is provided for the purpose of monitoring the power parameters of the mobile radio network, as well as for maintenance and error monitoring. It is also possible to provide independent operating and maintenance centers for subcomponents of the mobile radio network, for example a base station system. Provisions are also made to manage parameters of the air interface, for example the dynamic ranges outlined below, in the operating and maintenance center OMC.

For the air interface between the base station BS and the mobile stations MS, a frequency channel is discussed in which the connections are separated neither by a time slot, as in the case of the TDMA method, nor by their frequency, as in the case of the FDMA method. The subscriber signals are therefore distinguished with the aid of a subscriber code in a channel characterized by a frequency and, if applicable, additionally by a time slot. However, the method outlined below can also be used when another kind of subscriber separation is performed. In order to separate the subscribers by their subscriber code, the subscriber signals are modulated with the subscriber code at the transmitting end, for example in the base station BS for the downward direction, and detected at the receiving end with the aid of the subscriber code present there using the JD-CDMA method.

The movement of the mobile stations MS and their different distances from the base station BS cause attenuations for the different connections over the air interface that differ considerably from one another. This attenuation corresponds, for example, to column 2 of Table 1.

The attenuations additionally serve to allocate the mobile station MS to a specific time/frequency channel.

Figure 2:
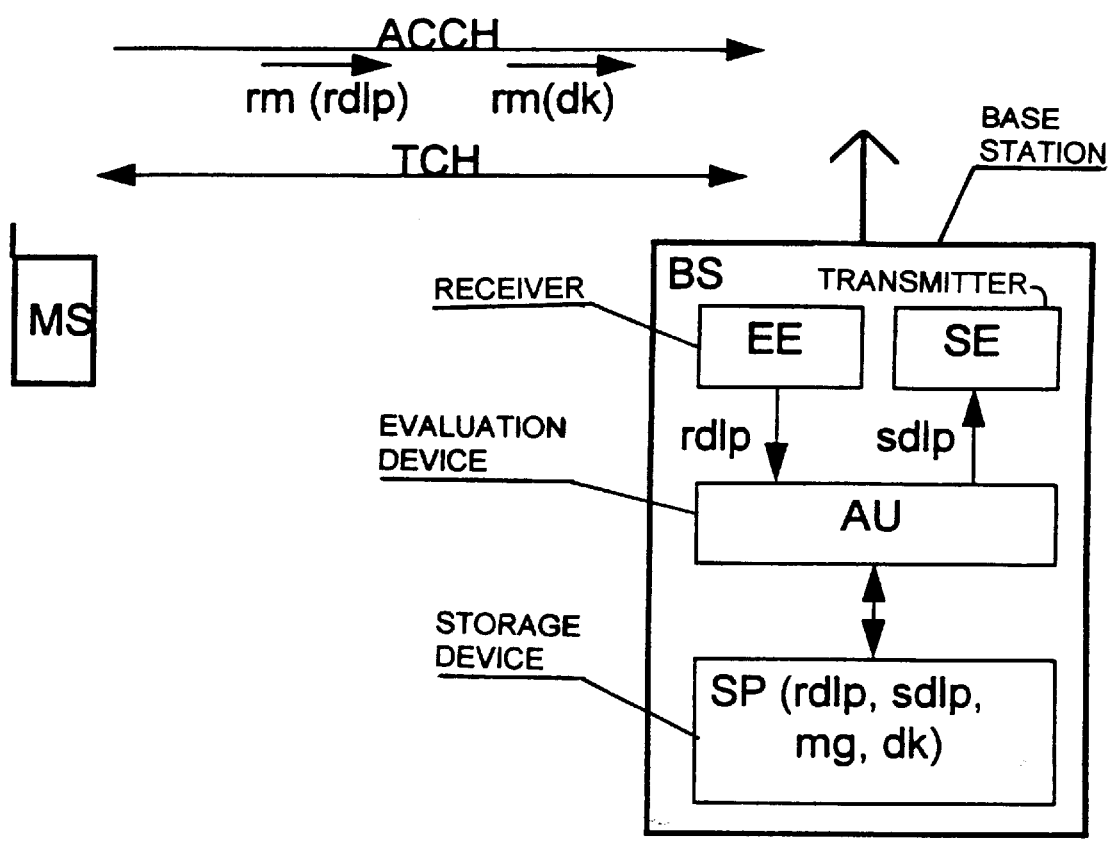
FIG. 2 is a schematic illustration of a connection between a base station and mobile stations, the structural configuration of the base station being illustrated as a block diagram.

During the call set-up, in accordance with FIG. 2, a mobile station MS signals or transmits, using a report message rm in a control channel ACCH, equipment characteristics, for example also a dynamic class dk, to the base station BS. This dynamic class dk is stored at the network end in the base station BS, and serves to determine a dynamic range mg for this mobile station MS. During the connection for which a user data channel TCH has been set up, the mobile station MS continuously determines in the downward direction the received power rdlp of the transmission in the user data channel TCH, and signals the averaged received powers rdlp at specific intervals to the base station BS with a further report message rm in the control channel ACCH.

The base station BS receives these report messages rm and evaluates them. In a simplified view, the base station BS includes a receiver EE and a transmitter SE. These devices EE, SE operate to receive and transmit the information, both user data and signaling, for the connection.

Moreover, the receiver EE extracts the transmitted received powers rdlp from the report messages rm and transfers them to an evaluation device AU. The evaluation device AU is connected, furthermore, to a storage device SP. The transmitted or transferred received powers rdlp of the mobile stations MS, the dynamic classes dk and also dynamic ranges mg set at the network end and, as shown below, specific transmit powers sdlp are stored in this storage device SP.

The evaluation device AU determines from these data the transmit powers sdlp which are transferred to the transmitter SE, whereupon the latter sets the transmission of information to the corresponding connections in the user data channel TCH in terms of power and in a fashion specific to the mobile station. A transmit signal formed in the base station BS consequently includes in a time/frequency channel superimposed signal components from a plurality of connections which are distinguished by the subscriber code, with which they are spread, and, as the case may be, distinguished by the transmit power sdlp for the signal component.

The evaluation device AU and the storage device SP need not be integrated in the base station BS but may also be integrated in other devices of the mobile radio network, for example in the radio subcontroller BSC, which implements the functions of the radio resources management, or alternatively, the evaluation device AU and the storage device SP can form an independent unit.

The method for the transmit power control is explained in more detail with reference to FIG. 3. For all frequency channels, the received powers rdlp, which are transmitted as averaged measured values by the mobile stations MS at intervals of 100 ms to 1 s, are evaluated repeatedly in all time slots. The report messages rm of the mobile stations MS, which are transmitted in the associated control channel ACCH, are processed for this purpose.

The connection with the maximum attenuation, that is to say the minimum received power rdlpmin, is determined for each frequency channel and each time slot. According to Table 1, this is, for example, the connection to the mobile station MS1, the attenuation of the radio channel to this mobile station being 80 dB.

Since the attenuations to all the mobile stations MS are known from the received power measurements, the corresponding transmit powers sdlp can be determined. A transmission performance or transmission quality, which is to be ensured, is taken into account in this case, wherein, in particular, the connection with the maximum attenuation is taken into consideration. For the first mobile station MS1, for example, the maximum theoretical transmit power Pmax amounts to 0 dB as a reference. Theoretical transmit powers sdlp to the remaining mobile stations are, for example, −20 to −40 dB in accordance with the attenuations.

For all connections of this frequency channel and time slot, the theoretical transmit powers sdlp are compared with the maximum transmit power Pmax reduced by the dynamic range mg. The dynamic range mg is specified to be 20 dB, for example, for this radio cell (or for the frequency channel and time slot individually), since the dynamic ranges dk of the mobile stations MS do not provide otherwise. If sdlp<Pmax−mg, the actually selected transmit power sdlp is set at sdlp=Pmax−mg for this connection. Thus it is ensured that the difference between the maximum transmit power Pmax and the minimum transmit power sdlp is never greater than the dynamic range mg. The result is the transmit power values in accordance with the last column of Table 1.

I claim:

1. A method for controlling transmit power for connections between a base station and mobile stations of a radio communications system, the method which comprises:

designating a direction of transmissions from mobile stations to a base station as an upward direction, and designating a direction of transmissions from the base station to the mobile stations as a downward direction;

transmitting information to the mobile stations in the downward direction simultaneously in a frequency channel;

determining received powers at at least two of the mobile stations in the downward direction;

setting a dynamic range for the frequency channel;

determining theoretical transmit powers for the base station, the theoretical transmit powers being mobile-station-specific by taking into account the received powers, and the theoretical transmit powers including a maximum theoretical transmit power; and determining a respective actual transmit power for each of the theoretical transmit powers by setting the respective actual transmit power to be equal to the maximum theoretical transmit power reduced by the dynamic range, if a corresponding one of the theoretical transmit powers is smaller than the maximum theoretical transmit power reduced by the dynamic range, and by setting the respective actual transmit power to be equal to the corresponding one of the theoretical transmit powers for remaining ones of the theoretical transmit powers, such that a minimum actual transmit power is at least equal to a maximum actual transmit power reduced by the dynamic range.

2. The method according to claim 1, which comprises:

determining a minimum received power; and calculating, from the minimum received power, the maximum theoretical transmit power for the downward direction corresponding to an adequate transmission quality.

3. The method according to claim 1, which comprises transmitting the information simultaneously to the mobile stations in a time channel of the frequency channel, the time channel being formed by a time slot and the information being distinguishable by a subscriber-specific fine structure.

4. The method according to claim 3, which comprises using a Joint-Detection-CDMA process at a receiving side for detecting information of different connections between the base station and the mobile stations.

5. The method according to claim 1, which comprises setting the dynamic range as a function of a radio cell.

6. The method according to claim 1, which comprises:

assigning a dynamic class to at least one of the mobile stations, the dynamic class designating at least one dynamic range; and storing and evaluating the dynamic class and further dynamic classes of the frequency channel at a network end.

7. The method according to claim 6, which comprises assigning selected ones of the mobile stations having substantially identical or similar attenuations to a common frequency channel.

8. The method according to claim 1, which comprises repeatedly performing the step of determining theoretical transmit powers for controlling the respective actual transmit power, an interval between the repeatedly performed determining steps being approximately in a range between 100 ms and 1 s.

9. The method according to claim 1, which comprises:

measuring a value of each of the received powers in the at least two of the mobile stations; and subsequently transferring the value to the base station in a respective report message.

10. The method according to claim 9, which comprises transferring the respective report message in a control channel, the control channel being assigned to a user data channel.

11. The method according to claim 1, which comprises:

measuring values of the received powers in the at least two of the mobile stations; and averaging the measured values of the received powers for determining the received powers in the at least two of the mobile stations.

12. The method according to claim 1, which comprises one of decreasing and increasing the respective actual transmit power in discrete steps.

13. A device for controlling transmit power for connections between a base station and mobile stations of a radio communications system, comprising:

a storage device for storing a dynamic range and for storing received powers determined at at least two mobile stations; and an evaluation device for determining mobile-station-specific theoretical transmit powers for a base station and setting respective actual transmit powers;

said evaluation device determining the mobile-station-specific theoretical transmit powers by taking into account the received powers; and said evaluation device determining the respective actual transmit powers for each of the theoretical transmit powers by setting the respective actual transmit powers to be equal to a maximum theoretical transmit power reduced by the dynamic range, if corresponding ones of the theoretical transmit powers are smaller than the maximum theoretical transmit power reduced by the dynamic range, and by setting the respective actual transmit powers to be equal to the corresponding ones of the theoretical transmit powers for remaining ones of the theoretical transmit powers, a minimum actual transmit power at least being equal to a maximum actual transmit power reduced by the dynamic range.

14. A method for controlling transmit power for connections between a base station and mobile stations of a radio communications system, the method which comprises:

designating a direction of transmissions from mobile stations to a base station as an upward direction, and designating a direction of transmissions from the base station to the mobile stations as a downward direction;

transmitting information to the mobile stations in the downward direction simultaneously in a frequency channel;

determining received powers at at least two of the mobile stations in the downward direction;

setting a dynamic range of transmit powers for the frequency channel;

determining transmit powers for the base station, the transmit powers being mobile-station-specific by taking into account the received powers, a minimum transmit power being at least equal to a maximum transmit power reduced by the dynamic range;

assigning a dynamic class to at least one of the mobile stations, the dynamic class designating at least one dynamic range; and storing and evaluating the dynamic class and further dynamic classes of the frequency channel at a network end.

15. The method according to claim 14, which comprises assigning selected ones of the mobile stations having substantially identical or similar attenuations to a common frequency channel.

* * * * *